(12) United States Patent
Scheidt et al.

(10) Patent No.: US 8,712,046 B2
(45) Date of Patent: *Apr. 29, 2014

(54) CRYPTOGRAPHIC KEY SPLIT COMBINER

(75) Inventors: Edward M. Scheidt, Herndon, VA (US); C. Jay Wack, Herndon, VA (US)

(73) Assignee: TecSec Inc., Herndon, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/544,132

(22) Filed: Jul. 9, 2012

(65) Prior Publication Data

US 2013/0177152 A1 Jul. 11, 2013

Related U.S. Application Data

(60) Continuation of application No. 11/369,900, filed on Mar. 6, 2006, now Pat. No. 7,974,410, which is a continuation of application No. 09/874,364, filed on Oct. 9, 2001, now Pat. No. 7,212,632, which is a division of application No. 09/023,672, filed on Feb. 13, 1998, now Pat. No. 6,885,747, application No. 13/544,132, which is a continuation of application No. 13/175,682, filed on Jul. 1, 2011.

(60) Provisional application No. 60/039,696, filed on Feb. 13, 1997, provisional application No. 61/505,665, filed on Jul. 8, 2011.

(51) Int. Cl.
*H04L 9/12* (2006.01)
*H04L 9/22* (2006.01)
*H04L 9/24* (2006.01)
*H04L 9/08* (2006.01)

(52) U.S. Cl.
CPC .............. *H04L 9/0861* (2013.01); *H04L 9/085* (2013.01); *H04L 9/0869* (2013.01)
USPC .......................................................... 380/47

(58) Field of Classification Search
None
See application file for complete search history.

(56) References Cited

U.S. PATENT DOCUMENTS 3,956,615 A 5/1976 Anderson et al.
4,145,568 A 3/1979 Ehrat
(Continued)

FOREIGN PATENT DOCUMENTS

GB 2293737 A 4/1996

OTHER PUBLICATIONS

Ames, Troy J., XML in an Adaptive Framework for Instrument Control, Proceedings of the 2004 IEEE Aerospace Conference, Mar. 6-13, 2004, pp. 1-11, vol. 5.

(Continued)

*Primary Examiner* — Gilberto Barron, Jr.
*Assistant Examiner* — David Le
(74) *Attorney, Agent, or Firm* — IP Strategies (57) ABSTRACT

A cryptographic key split combiner includes a plurality of key split generators adapted to generate cryptographic key splits, a key split randomizer adapted to randomize the cryptographic key splits to produce a cryptographic key, and a digital signature generator. Each of the key split generators is adapted to generate key splits from seed data. The digital signature generator is adapted to generate a digital signature based on the cryptographic key. The digital signature generator can also be adapted to generate the digital signature based on a credential value. A process for forming cryptographic keys includes generating a plurality of cryptographic key splits from seed data. The cryptographic key splits are randomized to produce a cryptographic key. A digital signature is generated based on the cryptographic key. Generating a digital signature based on the cryptographic key can include generating the digital signature based on a credential value.

4 Claims, 10 Drawing Sheets

(56) References Cited

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 4,424,414 A | 1/1984 | Hellman et al. | |
| 4,713,753 A | 12/1987 | Boebert et al. | |
| 4,757,537 A | 7/1988 | Edelmann et al. | |
| 4,864,616 A | 9/1989 | Pond et al. | |
| 4,955,082 A | 9/1990 | Hattori et al. | |
| 4,962,533 A | 10/1990 | Krueger et al. | |
| 4,984,272 A | 1/1991 | McIlroy et al. | |
| 5,052,040 A | 9/1991 | Preston et al. | |
| 5,065,429 A | 11/1991 | Lang | |
| 5,168,371 A | 12/1992 | Takayanagi | |
| 5,191,611 A | 3/1993 | Lang | |
| 5,204,961 A | 4/1993 | Barlow | |
| 5,222,018 A | 6/1993 | Sharpe et al. | |
| 5,276,738 A | 1/1994 | Hirsch | |
| 5,319,562 A | 6/1994 | Whitehouse | |
| 5,369,702 A | 11/1994 | Shanton | |
| 5,369,707 A | 11/1994 | Follendore, III | |
| 5,499,297 A | 3/1996 | Boebert | |
| 5,535,279 A | 7/1996 | Seestrom | |
| 5,535,297 A | 7/1996 | Goettsche | |
| 5,541,994 A | 7/1996 | Tomko et al. | |
| 5,557,765 A | 9/1996 | Lipner et al. | |
| 5,568,639 A | 10/1996 | Wilcox et al. | |
| 5,574,898 A | 11/1996 | Leblang et al. | |
| 5,602,921 A | 2/1997 | Ramadei | |
| 5,627,894 A | 5/1997 | Albert et al. | |
| 5,664,177 A | 9/1997 | Lowry | |
| 5,680,452 A | 10/1997 | Shanton | |
| 5,684,705 A | 11/1997 | Herbert | |
| 5,694,472 A | 12/1997 | Johnson et al. | |
| 5,696,829 A | 12/1997 | Cordery et al. | |
| 5,710,815 A | 1/1998 | Ming et al. | |
| 5,717,755 A | 2/1998 | Shanton | |
| 5,749,078 A | 5/1998 | Gargiulo et al. | |
| 5,751,808 A | 5/1998 | Anshel et al. | |
| 5,754,939 A | 5/1998 | Herz et al. | |
| 5,757,920 A * | 5/1998 | Misra et al. | 713/158 |
| 5,778,066 A | 7/1998 | Shah et al. | |
| 5,778,069 A | 7/1998 | Thomlinson et al. | |
| 5,794,234 A | 8/1998 | Church et al. | |
| 5,796,826 A | 8/1998 | Park | |
| 5,850,443 A | 12/1998 | Van Oorschot et al. | |
| 5,898,781 A | 4/1999 | Shanton | |
| 5,953,419 A | 9/1999 | Lohstroh et al. | |
| 5,999,623 A | 12/1999 | Bowman et al. | |
| 6,009,177 A | 12/1999 | Sudia | |
| 6,011,847 A | 1/2000 | Follendore, III | |
| 6,055,634 A | 4/2000 | Severwright | |
| 6,098,071 A | 8/2000 | Aoyama et al. | |
| 6,105,012 A | 8/2000 | Chang et al. | |
| 6,119,229 A | 9/2000 | Martinez et al. | |
| 6,169,805 B1 | 1/2001 | Dunn et al. | |
| 6,223,287 B1 | 4/2001 | Douglas et al. | |
| 6,363,154 B1 | 3/2002 | Peyravian et al. | |
| 6,370,516 B1 | 4/2002 | Reese | |
| 6,385,552 B1 | 5/2002 | Snyder | |
| 6,542,608 B2 | 4/2003 | Scheidt et al. | |
| 6,549,623 B1 | 4/2003 | Scheidt et al. | |
| 6,606,386 B2 | 8/2003 | Scheidt et al. | |
| 6,608,901 B2 | 8/2003 | Scheidt et al. | |
| 6,694,433 B1 | 2/2004 | Kolouch | |
| 6,885,747 B1 | 4/2005 | Scheidt et al. | |
| 6,931,532 B1 | 8/2005 | Davis et al. | |
| 7,010,681 B1 | 3/2006 | Fletcher et al. | |
| 7,079,653 B2 | 7/2006 | Scheidt et al. | |
| 7,095,852 B2 | 8/2006 | Wack et al. | |
| 7,111,173 B1 | 9/2006 | Scheidt | |
| 7,188,176 B1 | 3/2007 | Nedderman et al. | |
| 7,212,632 B2 | 5/2007 | Scheidt et al. | |
| 7,738,660 B2 | 6/2010 | Scheidt et al. | |
| 7,817,800 B2 | 10/2010 | Wack et al. | |
| 2001/0050990 A1 | 12/2001 | Sudia | |
| 2002/0051540 A1 | 5/2002 | Glick et al. | |
| 2002/0150250 A1 | 10/2002 | Kitaya et al. | |
| 2003/0084332 A1 | 5/2003 | Krasinski et al. | |

OTHER PUBLICATIONS

Bray, et al. (Eds.), Extensible Markup Language (XML) 1.0, W3C Recommendations, Feb. 10, 1998, World Wide Web Consortium, www.w3.org/TR/1998/REC-xml-19980210.

Cover, XML and Encryption, the SGML/XML Web Page, Nov. 8, 2000 or earlier, Organization for the Advancement of Structured Information Standards, www.oasis-open.org/cover/xmlAndEncryption.html.

Reagle, et al. (Eds.), Draft Minutes, Minutes W3C XML-Encryption Workshop, Nov. 2, 2000 or earlier, World Wide Web Consortium, www.w3.org/2000/11/02-xml-encryption-ws/minutes.html.

Reagle, XML Encryption Requirements, Apr. 20, 2001, World Wide Web Consortium, wwww.w3.org/TR/xml-encryption-req.html.

Reagle, XML Encryption WG, Sep. 13, 2001 or earlier, World Wide Web Consortium, www.w3.org/Encryption/2001.

Dillaway, et al., XML Encryption Syntax and Processing Version 1.0, Dec. 15, 2000, World Wide Web Consortium, lists.w3.org/Archives/Public/xml-encryption/2000Dec/att-0024/01-XML Encryption_v01.html.

Imamura, et al. (Eds.), Decryption Transform for XML Signature, Jun. 26, 2001, World Wide Web Consortium, www.w3.org/TR/2001/WD-xmlenc-decrypt-20010626.

Refnes, Introduction to XML, XML 101, Aug. 28, 2001 or earlier, Internet.com, www.xmlfiles.com/xml/xml_intro.asp.

Refnes, How can XML be used?, XML 101, Aug. 28, 2001 or earlier, Internet.com, www.xmlfiles.com/xml/xml_usedfor.asp.

Refnes, XML Syntax, XML 101, Aug. 28, 2001 or earlier, Internet.com, www.xmlfiles.com/xml/xml_syntax.asp.

Refnes, XML Attributes, XML 101, Aug. 28, 2001 or earlier, Internet.com, www.xmlfiles.com/xml/xml_attributes.asp.

Imamura, et al., Specification of Element-wise XML Encryption, Aug. 2000, World Wide Web Consortium, lists.w3.org/Archives/Public/xml-encryption/2000Aug/att-0005/01-xmlenc-spec.html.

Garshol, Re: XML, Links and DTDs, Usenet: comp.text.sgml, Aug. 11, 1998.

Murphy, Re: opionions [sic] needed: will XML help me for this?, Usenet: microsoft.public.xml, Oct. 5, 1998.

Massey, an Introduction to Contemporary Cryptology, Proceedings of the IEEE, May 1998, pp. 533-549, vol. 76, No. 5.

Schneier, Untangling Public-Key Cryptography, Dr. Dobb's Journal, May 1992, pp. 16-28.

Rumbaugh, et al., Object-Oriented Modeling and Design, 1991, Sections 10.6 and 14.3, Prentice Hall.

Andreadis, et al, Software, Telecommunications and Computer Networks, 2007, SoftCOM 2007, 15th International Conference on Publication Year: 2007 , pp. 1-4.

Suyan, et al., Study of Digital Signature with Encryption Based on Combined Symmetric Key, E-Business and Information System Security, 2009, EBISS '09, International Conference on Publication Year: 2009, pp. 1-4.

http://en.wikipedia/XML, pp. 1-14, last visited: Sep. 6, 2006.

Sheeja, Erratic Cryptosystem for Elevated Message Security, Information Technology, 2007, ITNG '07, Fourth International Conference on; 2007, pp. 967-969.

\* cited by examiner

| Symmetric Credential |
|---|
| Credential ID
Symmetric Key Generation Key
KGK Version |

| Asymmetric Read Credential |
|---|
| Credential ID
Key Generation Private Key
Key Generation Public Key Key Gen Signature Public Key Symmetric Key Generating Key
KGK Version |

| Asymmetric Write Credential |
|---|
| Credential ID
Key Generation Public Key

Key Gen Signature Private Key
Key Gen Signature Public Key

Symmetric Key Generating Key
KGK Version |

| Asymmetric Read/Write Credential |
|---|
| Credential ID
Key Generation Private Key
Key Generation Public Key Key Gen Signature Public Key
Key Gen Signature Public Key Symmetric Key Generating Key
KGK Version |

Fig. 10

CRYPTOGRAPHIC KEY SPLIT COMBINER

CROSS-REFERENCE TO RELATED APPLICATIONS

This is a continuation-in-part of co-pending U.S. patent application Ser. No. 13/175,682, which was filed on Jul. 1, 2011; which in turn is a continuation of U.S. patent application Ser. No. 11/369,900, which was filed on Mar. 6, 2006 and is now U.S. Pat. No. 7,974,410, which issued on Jul. 5, 2011; which in turn is continuation of a U.S. patent application Ser. No. 09/874,364, which was filed on Oct. 9, 2001 and is now U.S. Pat. No. 7,212,632, which issued on May 1, 2007; which in turn is a divisional of U.S. patent application Ser. No. 09/023,672, which was filed on Feb. 13, 1998 and is now U.S. Pat. No. 6,885,747, which issued on Apr. 26, 2005; and which in turn is related to U.S. Provisional Patent Application No. 60/039,696, which was filed on Feb. 13, 1997.

FIELD OF THE INVENTION

The present invention relates to cryptographic systems. In particular, the present invention relates to a system for formulating cryptographic keys used to encrypt plaintext messages and decrypt ciphertext communications.

BACKGROUND OF THE INVENTION

In the modern world, communications are passed between parties in a variety of different ways utilizing many different communications media. Electronic communication is becoming increasingly popular as an efficient manner of transferring information, and electronic mail in particular is proliferating due to the immediacy of the medium.

Unfortunately, drawbacks accompany the benefits provided by electronic communication, particularly in the area of privacy. Electronic communications may be intercepted by unintended recipients. Wireless transmissions, such as voice communication by cellular telephone, and electronic mail are especially susceptible to such interception.

The problem of electronic communication privacy has been addressed, and solutions to the problem have been put in place. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

SUMMARY OF THE INVENTION

According to an aspect of the present invention, a cryptographic key split combiner includes a plurality of key split generators adapted to generate cryptographic key splits, a key split randomizer adapted to randomize the cryptographic key splits to produce a cryptographic key, and a digital signature generator. Each of the key split generators is adapted to generate key splits from seed data. The digital signature generator is adapted to generate a digital signature based on the cryptographic key. The digital signature generator can also be adapted to generate the digital signature based on a credential value.

According to another aspect of the present invention, a process for forming cryptographic keys includes generating a plurality of cryptographic key splits from seed data. The cryptographic key splits are randomized to produce a cryptographic key. A digital signature is generated based on the cryptographic key. Generating a digital signature based on the cryptographic key can include generating the digital signature based on a credential value.

BRIEF DESCRIPTION OF THE DRAWINGS

The present invention will be more completely understood by way of the following detailed description, with reference to the following drawings, wherein.

DETAILED DESCRIPTION OF THE INVENTION

Figure 1:
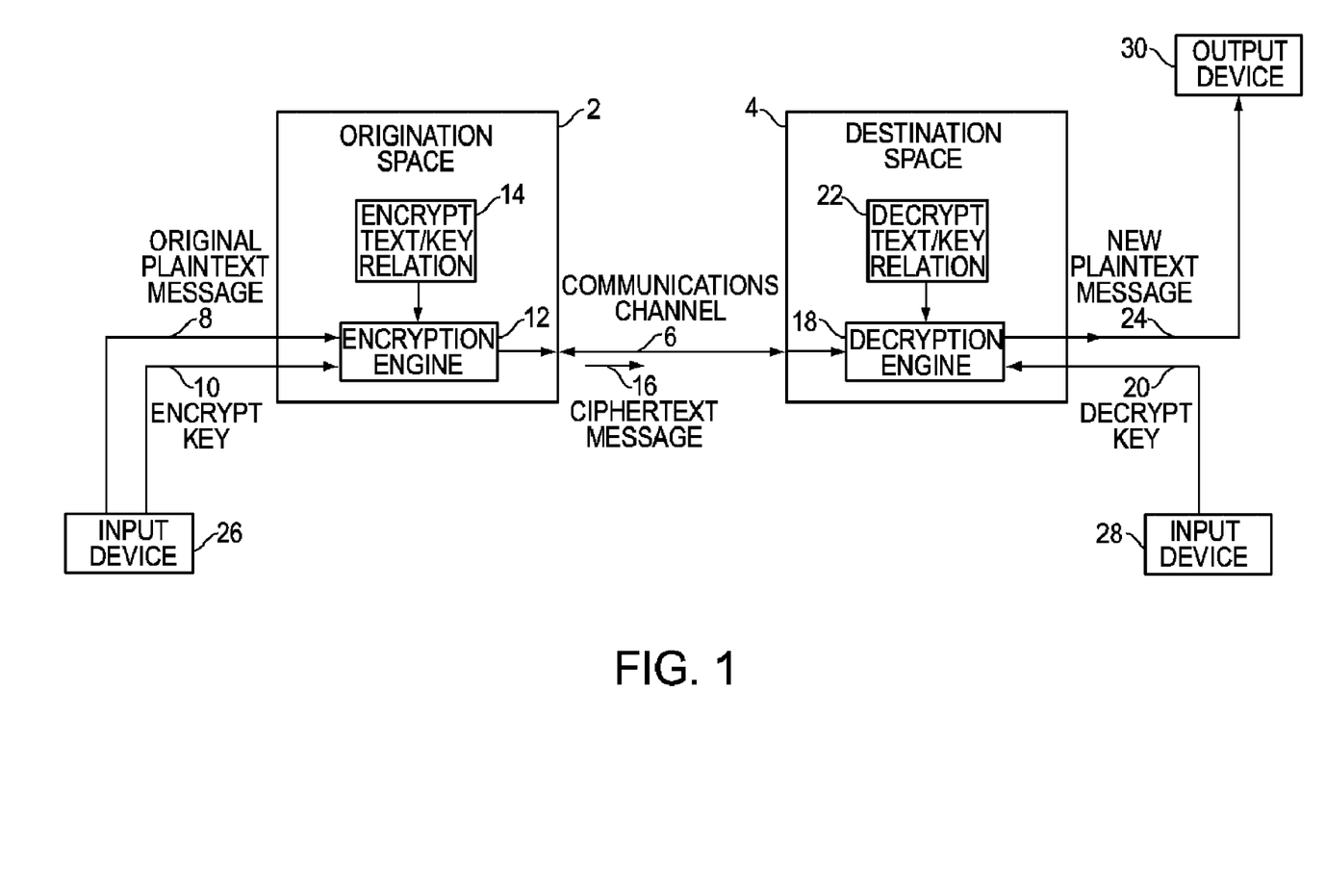
FIG. 1 is a block diagram of a communications event featuring cryptography.

Referring to FIG. 1, a communication has an origination space 2 and a destination space 4. The origination space 2 defines the place and time at which the communication originates. The destination space 4 defines the place and time at which the communication is intended to be decoded. The origination space 2 and the destination space 4 may be remote in location. Alternatively, they may be collocated but displaced in time. The space and time correspondence between the origination space 2 and the destination space 4 depends on the nature of a particular communication. The origination space 2 and destination space 4 are coupled to a common communications channel 6. This communications channel 6 may bridge a physical space, such as empty air in the case of a cellular voice telephone call. Alternatively, the communications channel 6 may be temporary storage for the communication while time passes between the origination space 2 and the destination space 4, such as a message left in memory on a computer by a first user, for a second user to read at a later time on the same computer. The communications channel 6 may also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer may have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, may also be provided to present the new plaintext message to the destination user. The text/key relation can be stored on a floppy disk or other permanent or temporary portable storage, rather than in hard storage in the computer, to allow different text/key relations to be applied by different users or in different situations.

Figure 2:
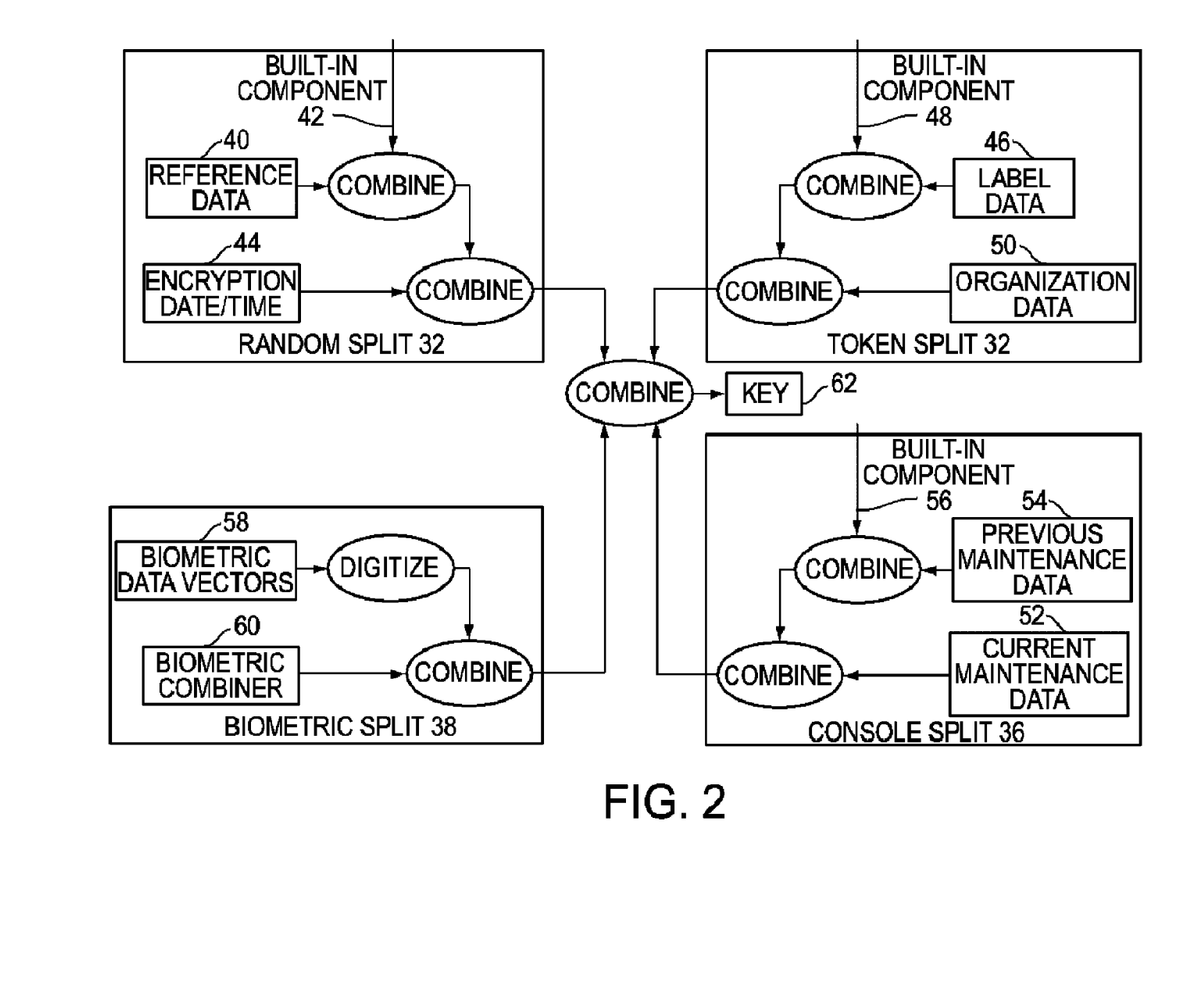
FIG. 2 is a block diagram of a key split combiner.

The keys that are provided at the origination space and at the destination space may be composed of several components, or splits, each of which may be provided by a different source. As shown in FIG. 2, a random key split 32 may be randomly or pseudorandomly generated. A second split 34 may be stored on a token. A third split 36 may be stored on a console, and a fourth split 38 may be provided by a biometric source. The key splits may be combined to form a complete cryptographic key. This key may take the form of a stream of symbols, a group of symbol blocks, an N-dimensional key matrix, or any other form usable by the particular encryption scheme.

The random split 32 provides a random component to the cryptographic key. This split 32 is randomly or pseudorandomly generated based on a seed which is provided by any source as reference data 40. For example, when a user attempts to log on to a system, the date and time of the user's log-on attempt, represented in digital form, can be used as a seed to generate the key split. That is, the seed may be provided to a pseudorandom sequence generator or other randomizer to produce the random split. Such pseudorandom sequence generators are well known in the art. For example, a simple hardware implementation could include a shift register, with various outputs of the register XORed and the result fed back to the input of the register. Alternatively, the seed may be combined, or randomized, with a built-in component 42, such as a fixed key seed stored at the origination space. The randomization may be performed, for example, by applying a variation of the text/key relation to the generated seed and the stored fixed key seed. This result may be further randomized with, for example, a digital representation of the date and time of the encryption 44, in order to produce the random key split 32.

The token split 34 may be generated in a similar fashion. In this case, the seed is provided on a token, that is, it is stored on a medium that is possessed by the user. For example, the seed may be stored on a floppy disk that the system must read as part of the encryption procedure. The token may store a number of different seeds, or label data 46, each of which corresponds to a different authorization provided by the system or specified by the user. For example, one seed may be used to generate a key split to authorize a particular user to read a message at a particular destination space. Another key seed may be used to generate a key split to authorize any member of a group of users to read a message at any destination space, and for one particular user to read the message and write over the message at a particular destination space. The label data 46 may even designate a window of time during which access to the communication is valid. This seed may be randomized with a built-in component 48, such as a seed stored at the origination space, which may then be further randomized with organization data 50 provided to the organization to which the user belongs.

The console split 36 is derived from a changing value stored at a user space, such as on a system console. Maintenance data, such as the checksum taken from a defragmentation table set, may be used to produce such changing values. For example, the current maintenance data 52 may be randomized with particular previous maintenance data. Alternatively, all previous maintenance data 54 may be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric samples of the user. For example, a retinal scanner may be used to obtain a unique retinal signature from the user. This information, in digital form, will then be used to generate the biometric split 38. This may be accomplished by, for example, randomizing a digital string corresponding to the biometric vectors 58 with biometric combiner data 60, which may be a digital hash of the user's system identification number or some other identifying data that can be linked to the user's physical data provided by the biometric reader. The resulting randomized data is the biometric split 38. The biometric split 38 provides information that is incapable of being reproduced by anyone but the user providing the biometric data vector 58.

The built-in key split components 42, 48, 56 described herein may be static in that they do not change based on uncontrolled parameters within the system. They may be updated for control purposes, however. For example, the built-in key split components 42, 48, 56 may be changed to modify the participation status of a particular user. The key split component may be changed completely to deny access to the user. Alternatively, only a single prime number divisor of the original key split component may be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

Once the key splits 32, 34, 36, 38 have been generated, they may be randomized together to produce the cryptographic key 62 for the communication. In performing each combination to generate the complete cryptographic key, a different variation of the text/key relation may be applied. The use of a plurality of different text/key relation variations adds to the security of the overall cryptographic scheme. It is contemplated that key splits other than those specifically described herein may be combined in forming the complete key 62. The total number of splits may also vary, and these splits may be used to build a key matrix to add to the complexity of the system. This complete key 62 should be in a form suitable for use in the particular cryptographic scheme. That is, different fields in the key may have different functions in the protocol of the communication, and should be arranged accordingly within the key.

At the destination space, the process is reversed in order to determine whether a user attempting to access a message has authorization, that is, has the valid key. The key supplied by the user at the destination space must include information required by the labels that were used to create the token split at the origination space. This information may also take the form of a token split. Further, a biometric split may be required as part of the destination key, in order to provide a link between assigned identification data for the user and physical data collected from the user biometrically. The token split and the biometric split may be combined with other splits at the destination space to form the complete destination key.

Figure 3:
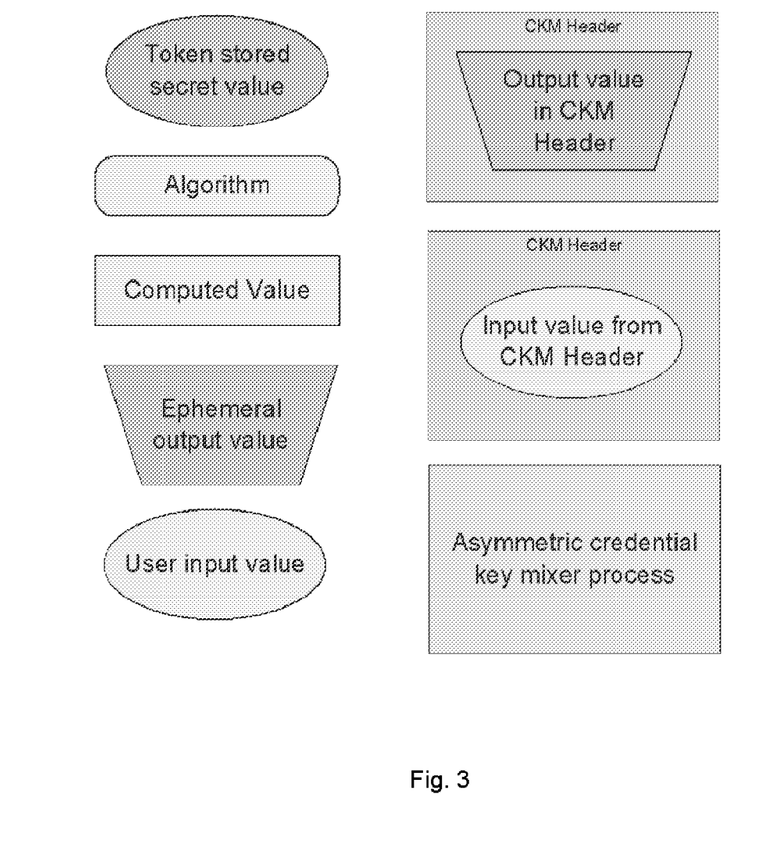
FIG. 3 is a diagram illustrating the generation of a credential signature.
Figure 4:
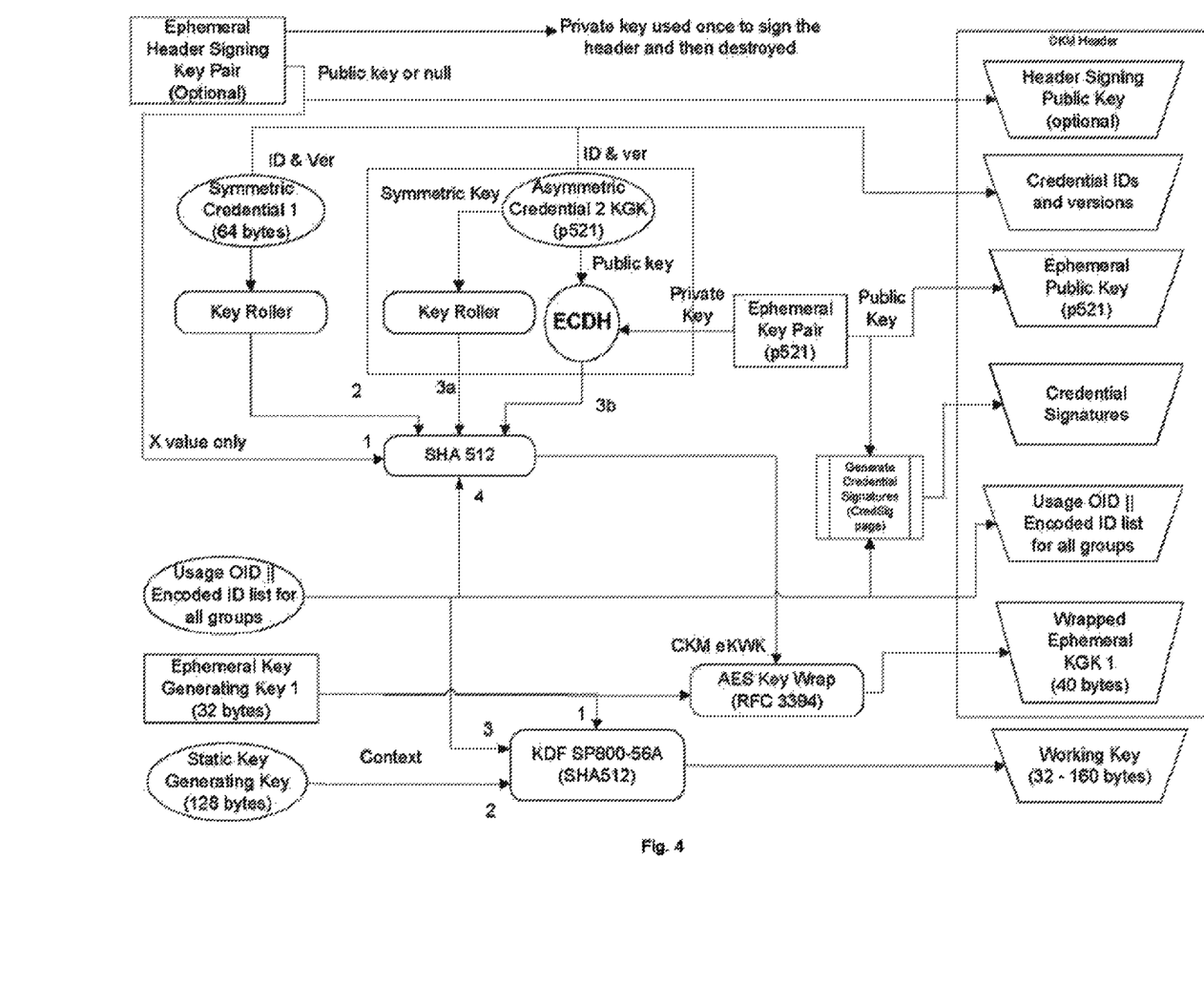
FIG. 4 is a diagram illustrating an exemplary 256-bit combiner in combine mode.
Figure 5:
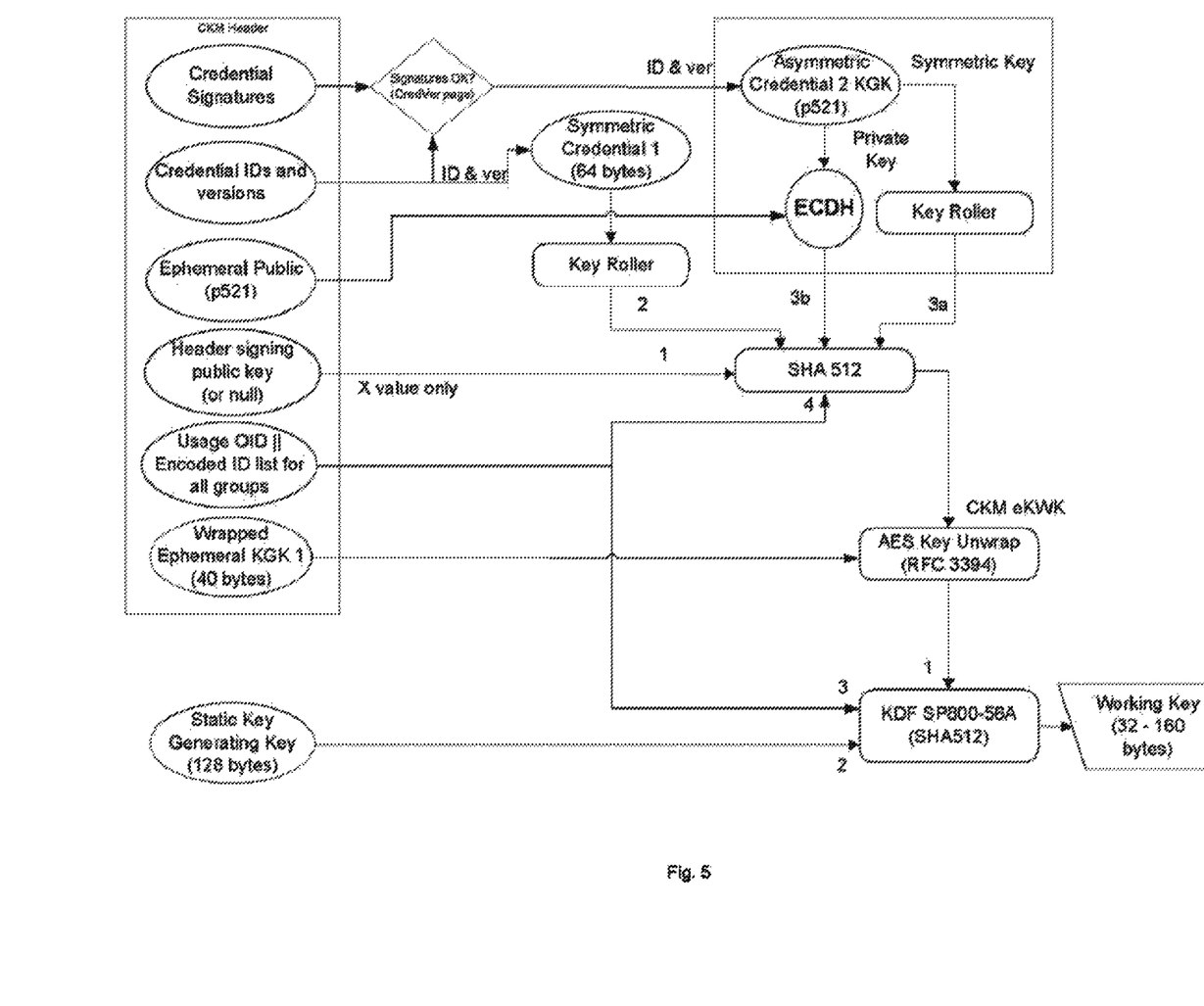
FIG. 5 is a diagram illustrating an exemplary 256-bit combiner in recombine mode.
Figure 6:
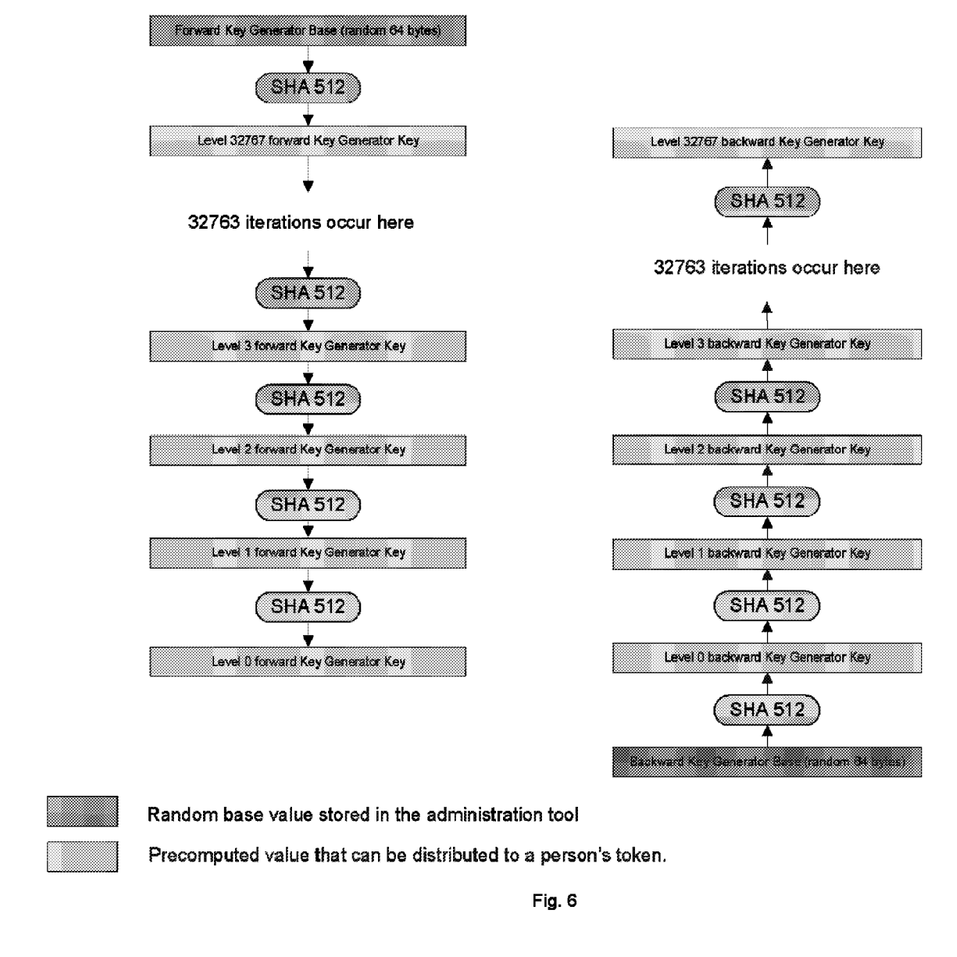
FIG. 6 is a diagram illustrating a key generator key derivation function.
Figure 7:
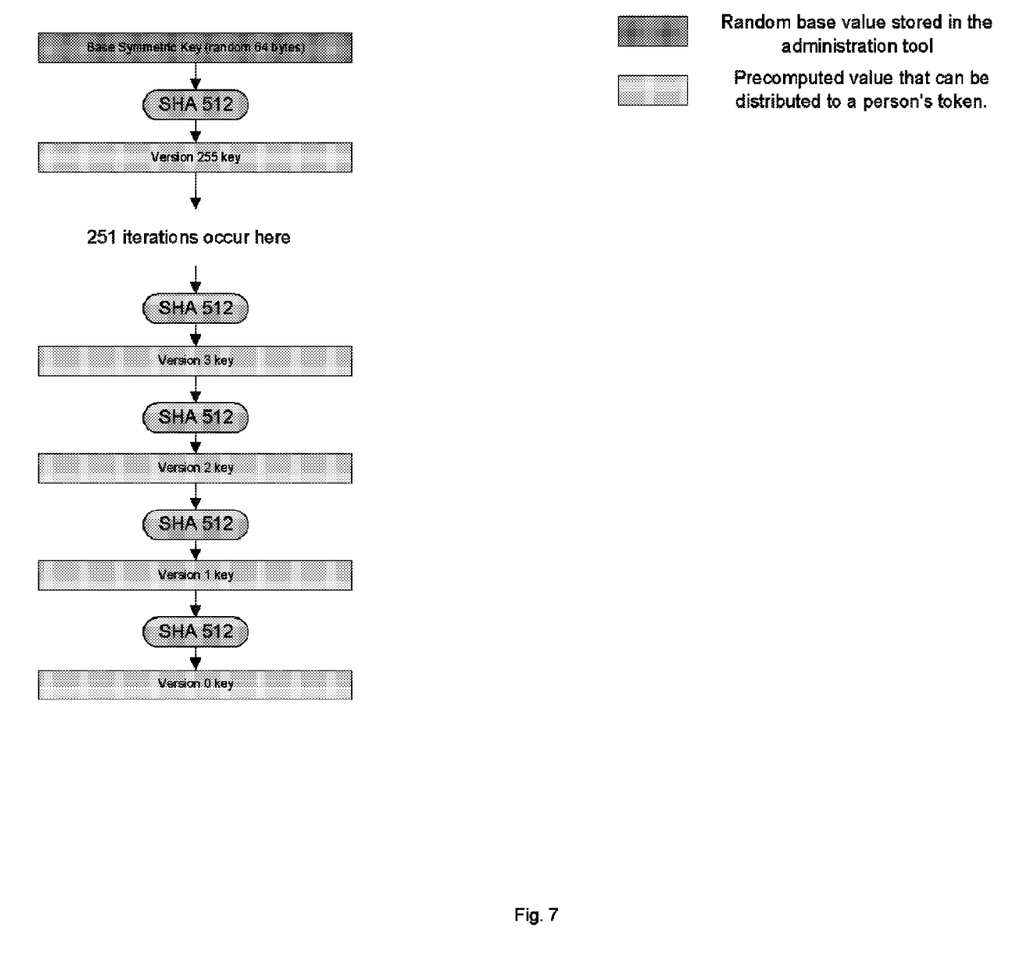
FIG. 7 is a diagram illustrating a symmetric key component key version roller.
Figure 8:
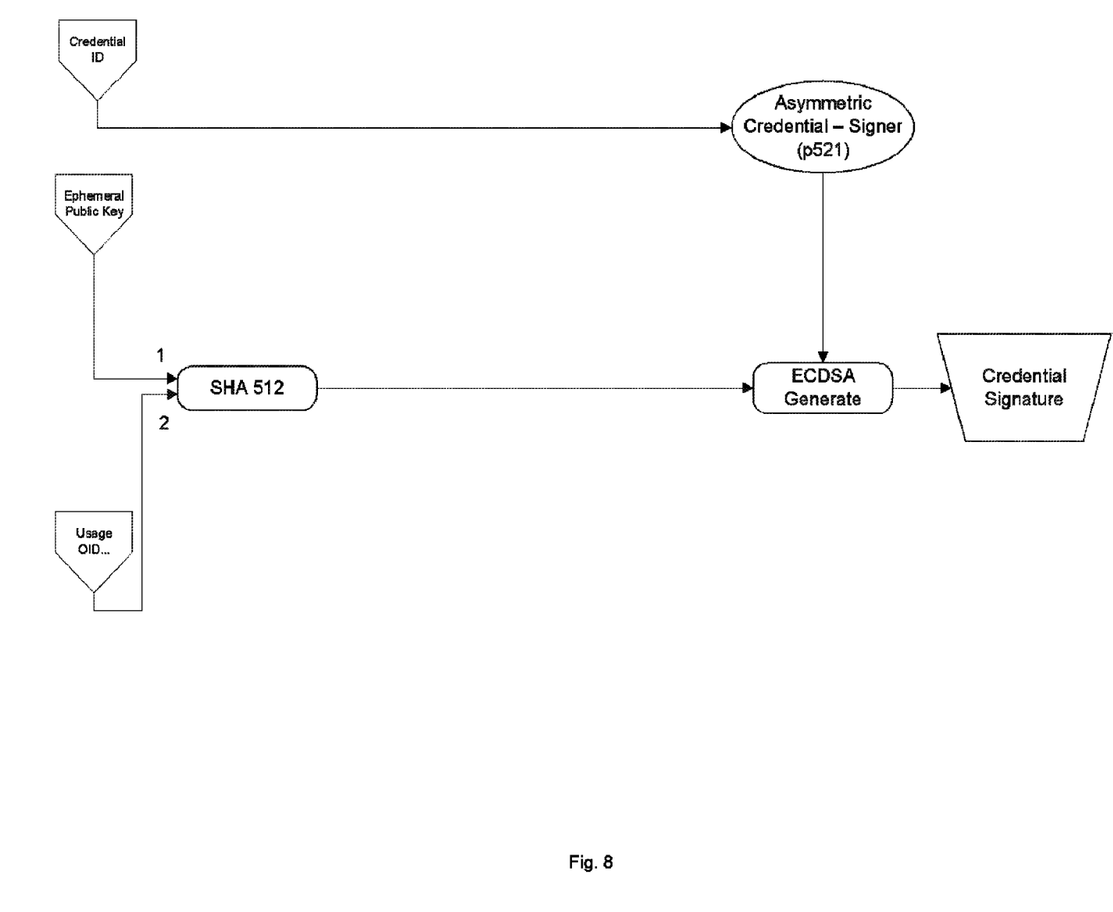
FIG. 8 is a diagram illustrating credential signature generation.
Figure 9:
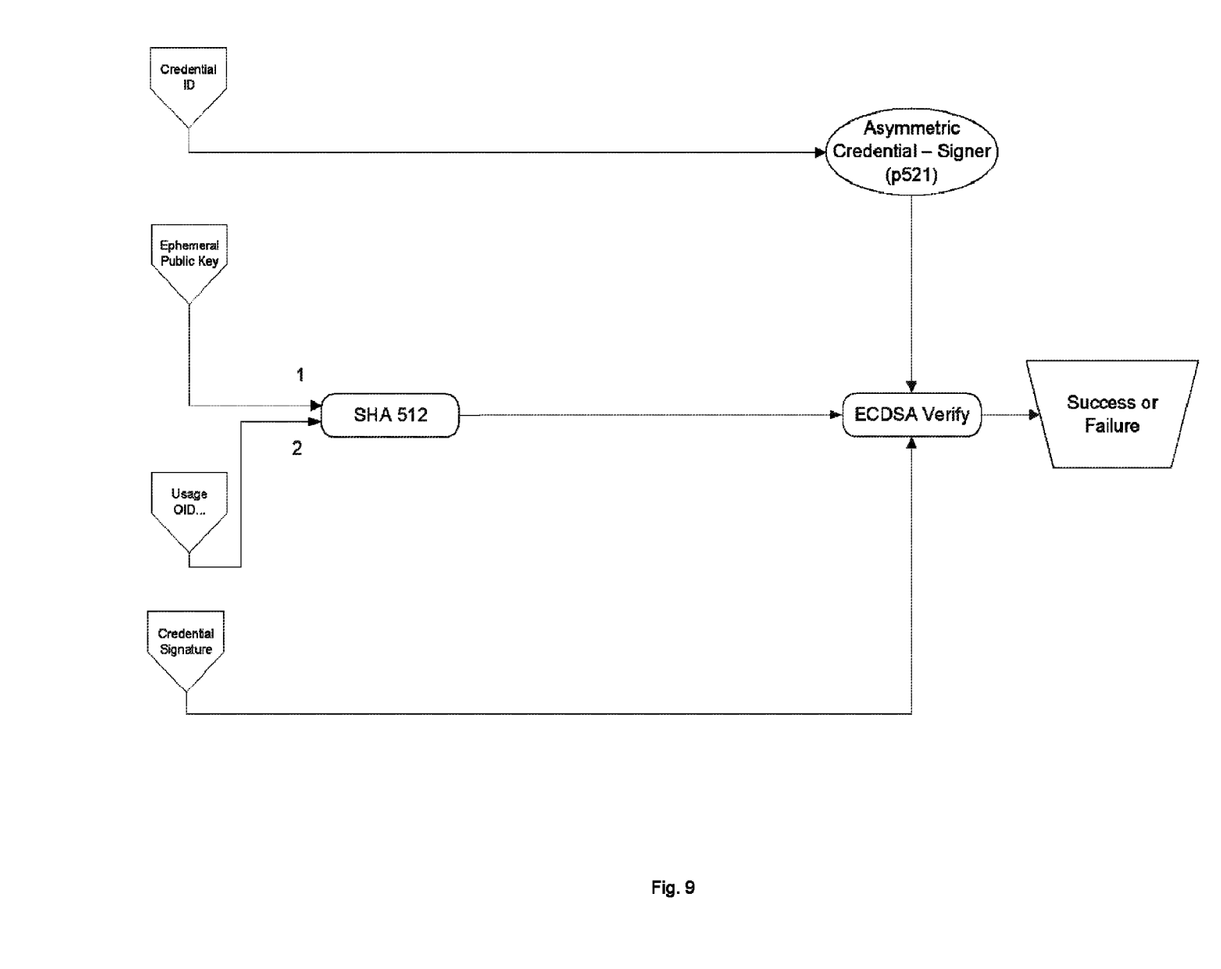
FIG. 9 is a diagram illustrating credential signature verification.
Figure 10:
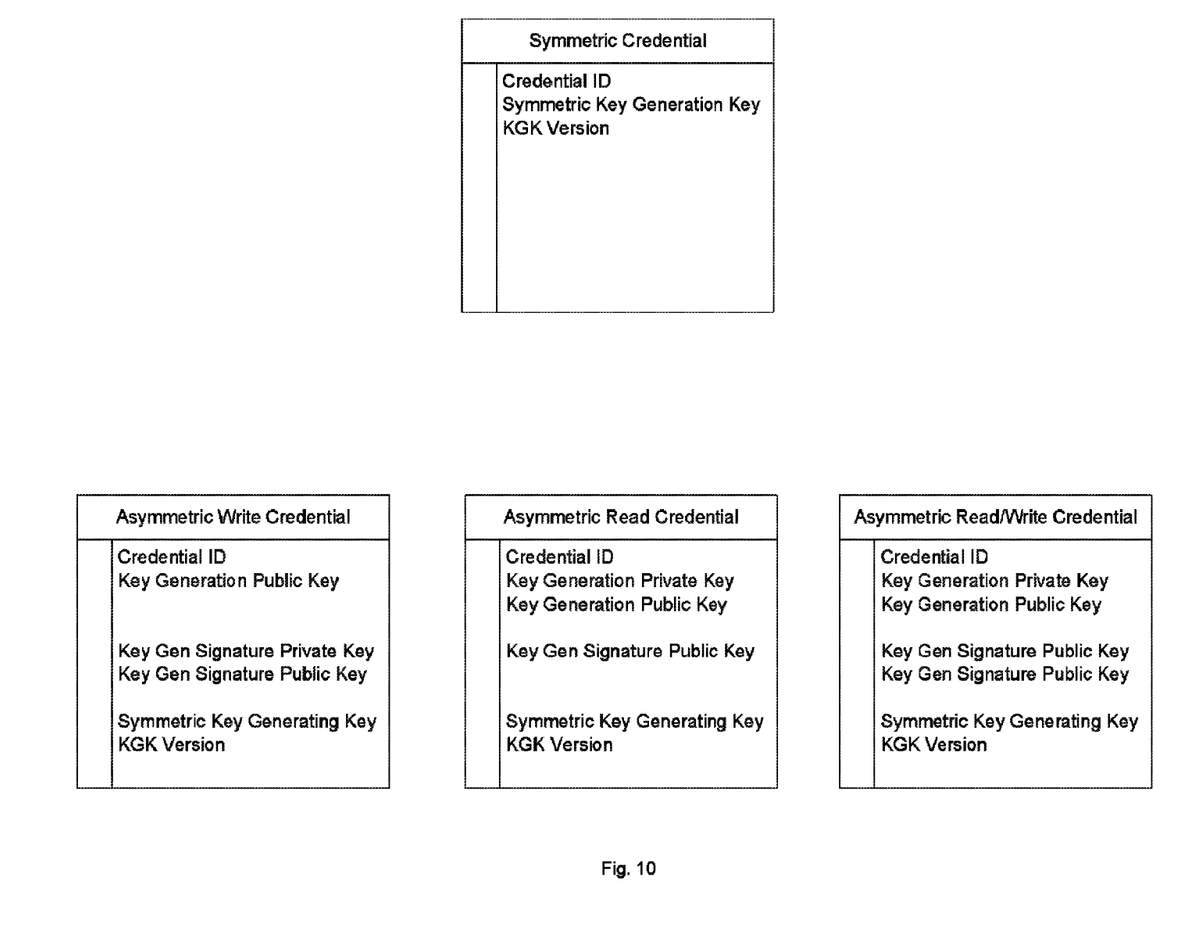
FIG. 10 is a diagram illustrating exemplary credentials.

The combiner can also include signature capability. For example, FIG. 3 illustrates a function identified as: Generate Credential Signature (CredSigpage), which can be added to further enhance the integrity of the combiner's read/write enforcement. This function utilizes an existing signature standard, such as the Digital Signature Algorithm (DSA) with Elliptical Curve (ECDSA), and couples the standard to a facet of the combiner to provide integrity to the credential (for example, to the key split based on label data). In an exemplary embodiment, this capability also leverages the ECDSA to enhance the security for the combiner header by binding, through an ECDSA signature, a constructive key management (CKM) operation to the CKM combiner header.

CKM is an exemplary key management architecture, different variations of which are described in U.S. Pat. No. 6,684,330 "Cryptographic information and flow control"; U.S. Pat. No. 6,608,901 "Cryptographic key split combiner"; U.S. Pat. No. 6,606,386 "Cryptographic key split combiner"; U.S. Pat. No. 6,549,623 "Cryptographic key split combiner"; U.S. Pat. No. 6,542,608 "Cryptographic key split combiner"; and U.S. Pat. No. 6,490,680 "Access control and authorization system"; and the following pending U.S. patent application Ser. No. 09/388,195 "Encryption Process Including a Biometric Input"; Ser. No. 09/858,326 "System and Method of Providing Communication Security"; Ser. No. 09/936,315 "Voice and Data Encryption Method Using a Cryptographic Key Split Combiner"; Ser. No. 10/147,433 "Cryptographic Key Split Bonding Process and Apparatus"; Ser. No. 10/194,742 "Secure Accounting and Operational Control and Reporting System"; and Ser. No. 10/278,765 "Access Control and Authorization System"; and further defineded in ANSI standards X9.69, X9.73, and X9.96, all the disclosures of which are incorporated herein in their entireties.

Two exemplary signature CKM combiner methodologies are:

1) Crypto Enforced Read/Write separation:
  a) FIG. 3 identifies an ECDSA created by taking the public key of the ephemeral key pair and some additional user input values such an encoded ID list to be used as inputs into an ECDSA algorithm. The ephemeral key pair is a result of a credential process and part of the CKM combiner. The resultant digital signature is used to have a cryptographic separation between a credential read capability and that same credential's write capability (a public key math by itself would only be half effective in enforcing read/write separation). The EC-CDH (Elliptical Curve Diffie-Hellman protocol) in combination with ECDSA algorithm for the credentials provides full read/write crypto separation.
  b) Credential Signatures:
    i) Combiner signs information that clearly identifies this CKM operation using the signing key portion of the CKM Credential.
    ii) The signature(s) is returned to the caller and put in the CKM Header.
    iii) The Combiner uses the encryption portion of the CKM Credential with the ephemeral key to compute the shared value used in the AES Key Wrap.
    iv) Recombiner verifies the credential signature using the verification key portion of the CKM Credential.
    v) If any used credential is not verified, the recombine operation fails.
    vi) Recombiner uses the decryption portion of the CKM Credential with the ephemeral key to compute the shared value used to unwrap the eKGK value. If the unwrap fails, then the CKM operation fails.
  c) Using this process, a public key value and private key value are always used from the CKM Credential (when asymmetric credentials are used). One part is for the signature/verification, the other part for the Encryption/Decryption. In this way we always have at least one value that cannot be computed and therefore have cryptographic separation of Read/Write or Create/Use.
  d) Illustrations of the Credential Signature Generation and Credential Signature Verification are shown in FIG. 3.

2) Signing the combiner header:
  a) Signing the combiner header with ECDSA binds selected functions of the combiner to the combiner header.
  b) ECDSA is used to provide a cryptographic binding of external data such as the Header to the CKM operation in an irrefutable manner. This is accomplished by using the public key of the ephemeral header signing key pair as one of the key splits into the CKM Combiner. In this way the external data is bound to the ephemeral signing key through the ECDSA signature. The ephemeral signing key is bound to the CKM operation through the use of the public key as one of the key splits. The CKM recombiner then uses the AES Key Wrap to validate that the correct key splits were used by validating that the correct check value is returned when unwrapping the ephemeral KGK value. This process then yields a cryptographic binding of the Header/External data to the CKM Recombiner to the CKM Working key.
c) Specifically, ECDSA header signing can be identified:
   i) where the combiner generates key pairs,
   ii) where the combiner and recombiner use public key internally to bind the key to the CKM operation,
   iii) where the combiner signs the header using a private key (only one sign operation), and
   iv) where the combiner disposes of the private key.

The invention has been described using exemplary and preferred embodiments. However, the scope of the present invention is not limited to these particular disclosed embodiments. To the contrary, the present invention is contemplated to encompass various modifications and similar arrangements The scope of the claims, therefore, should be accorded the broadest interpretation so as to include all such modifications and similar arrangements.

What is claimed is:

1. A cryptographic key split combiner, comprising:
   a) a plurality of key split generators adapted to generate cryptographic key splits;
   b) a key split randomizer adapted to randomize the cryptographic key splits to produce a cryptographic key; and
   c) a digital signature generator;
   d) wherein each of the key split generators is adapted to generate key splits from seed data; and
   e) wherein the digital signature generator is adapted to generate a digital signature based on the cryptographic key.

2. The cryptographic key split combiner of claim 1, wherein the digital signature generator is also adapted to generate the digital signature based on a credential value.

3. A process for forming cryptographic keys, comprising:
   a) generating a plurality of cryptographic key splits from seed data;
   b) randomizing the cryptographic key splits to produce a cryptographic key; and
   c) generating a digital signature based on the cryptographic key.

4. The process of claim 3, wherein generating a digital signature based on the cryptographic key includes generating the digital signature based on a credential value.

* * * * *